(12) United States Patent
Hou et al.

(10) Patent No.: US 12,479,145 B2
(45) Date of Patent: Nov. 25, 2025

(54) ANTIOXIDANT ADDITION DEVICE AND METHOD FOR 500 kV CROSS-LINKED POLYETHYLENE INSULATING MATERIAL

(71) Applicant: ELECTRIC POWER RESEARCH INSTITUTE. CHINA SOUTHERN POWER GRID, Guangzhou (CN)

(72) Inventors: Shuai Hou, Guangzhou (CN); Mingli Fu, Guangzhou (CN); Lingmeng Fan, Guangzhou (CN); Lei Jia, Guangzhou (CN); Yunpeng Zhan, Guangzhou (CN); Wenbo Zhu, Guangzhou (CN); Baojun Hui, Guangzhou (CN); Bin Feng, Guangzhou (CN); Jie Liu, Guangzhou (CN)

(73) Assignee: ELECTRIC POWER RESEARCH INSTITUTE. CHINA SOUTHERN POWER GRID, Guangzhou (CN)

( * ) Notice: Subject to any disclaimer, the term of this patent is extended or adjusted under 35 U.S.C. 154(b) by 0 days.

(21) Appl. No.: 19/112,943

(22) PCT Filed: Nov. 21, 2022

(86) PCT No.: PCT/CN2022/133116
§ 371 (c)(1),
(2) Date: Mar. 18, 2025

(87) PCT Pub. No.: WO2024/060391
PCT Pub. Date: Mar. 28, 2024

(65) Prior Publication Data
US 2025/0256449 A1    Aug. 14, 2025

(30) Foreign Application Priority Data
Sep. 23, 2022   (CN) .......................... 202211164758.X

(51) Int. Cl.
*B29C 48/285*  (2019.01)
*B29B 13/10*   (2006.01)
(Continued)

(52) U.S. Cl.
CPC ............ *B29C 48/286* (2019.02); *B29B 13/10* (2013.01); *B29C 48/287* (2019.02); *B29C 48/29* (2019.02); *B29C 48/92* (2019.02)

(58) Field of Classification Search
CPC ..... B29B 13/10; B29C 48/286; B29C 48/287; B29C 48/29; B29C 48/92
See application file for complete search history.

(56) References Cited

U.S. PATENT DOCUMENTS 2,773,047 A * 12/1956 Pirot et al. ................ D01F 6/18
                                                           264/182
3,981,416 A *  9/1976 Scholl .................. B29B 13/022
                                                           222/146.1
(Continued)

FOREIGN PATENT DOCUMENTS

CN          202169691 U     3/2012
CN          104200931 A    12/2014
(Continued)

OTHER PUBLICATIONS

ISA / CN, International Search Report & Written Opinion issued in corresponding Application No. PCT/CN2022/133116, dated May 19, 2023, 15 pp.

(Continued)

*Primary Examiner* — Xiao S Zhao
*Assistant Examiner* — Joseph S Leyson
(74) *Attorney, Agent, or Firm* — Taft Stettinius & Hollister LLP

(57) ABSTRACT

An antioxidant addition device for a 500 kV cross-linked polyethylene insulating material includes a heating hopper
(Continued)

module and a heat-insulation conduit module. The heating hopper module includes an inlet port, a heating jacket, a material bin, and a filter screen. The heat-insulation conduit module includes a liquid metering pump, a stainless steel liquid-conduit, a heat-insulation unit, and an outlet port. The antioxidant is added into the material bin through the inlet port, heated in the material bin to a liquid phase antioxidant, filtered through the filter screen, then metered by the liquid metering pump, then passed into the stainless steel liquid-conduit, and finally discharged through the outlet port for use.

13 Claims, 3 Drawing Sheets

(51) Int. Cl.
*B29C 48/29* (2019.01)
*B29C 48/92* (2019.01)

(56) References Cited

U.S. PATENT DOCUMENTS

| | | | | |
|---|---|---|---|---|
| 4,528,155 A | * | 7/1985 | Elder | B29C 48/15 |
| | | | | 264/211 |
| 5,741,532 A | * | 4/1998 | Lilly | B29C 48/793 |
| | | | | 425/197 |
| 2019/0070752 A1 | | 3/2019 | Labbe | |

FOREIGN PATENT DOCUMENTS

| | | |
|---|---|---|
| CN | 204431541 | 7/2015 |
| CN | 105773863 A | 7/2016 |
| CN | 112280149 A | 1/2021 |
| JP | H0952273 A | 2/1997 |
| JP | 2012007111 A | 1/2012 |
| WO | 2022022703 A1 | 2/2022 |

OTHER PUBLICATIONS

Chinese Patent Office, Office Action issued in corresponding Application No. 202211164758.X, dated Jan. 9, 2025, 7 pp.

* cited by examiner k-direction

ANTIOXIDANT ADDITION DEVICE AND METHOD FOR 500 kV CROSS-LINKED POLYETHYLENE INSULATING MATERIAL

CROSS-REFERENCE TO RELATED APPLICATIONS

This application is an U.S. national phase application under 35 U.S.C. § 371 based upon international patent application No. PCT/CN2022/133116 filed on Nov. 21, 2022, which itself claims priority to Chinese patent application No. 202211164758X, filed on Sep. 23, 2022. The contents of the above identified applications are hereby incorporated herein in their entireties by reference.

TECHNICAL FIELD

The present application belongs to the technical field of insulating materials, in particular to an antioxidant addition device and method for 500 kV cross-linked polyethylene insulating material.

BACKGROUND

Cross-linked polyethylene insulating materials are widely used in the manufacturing of high-voltage cables. The production of high-voltage cross-linked polyethylene insulating materials for cables involves mixing a low-density polyethylene resin with a functional additive in a molten state at a specific ratio, followed by re-granulation and the incorporation of a cross-linking agent in the subsequent processing steps.

For the material with a low voltage level, the amounts of individual components in the formulation of the material are designed with a high degree of redundancy, ensuring that even if there are deviations in the amounts added, the performance of the material will not be affected. However, for the material with a voltage level of 500 kV or above, in order to balance various performance aspects of the material, the amounts of individual components of the material are designed with a critical ratio. This requires maintaining the ratio of individual additive components of the material with sufficient accuracy, and precisely controlling the amounts of individual components added during the manufacturing process of the material to ensure that the final product meets the designed performance criteria.

Antioxidants are additives that must be added to ensure that the materials possess certain anti-aging properties. In industrial production, a hollow metering screw is used to continuously add a certain amount of antioxidant into a low-density polyethylene resin melt. Generally, the antioxidants commonly used in the cross-linked polyethylene insulating materials are in form of solid powders, which are continuously added during the production of the materials by a hollow screw. However, due to low melting points of some antioxidants (for example, the melting point of the antioxidant 1010 is 110° C. to 125° C., the melting point of the antioxidant 1035 is 63° C. to 67° C., and the melting point of the antioxidant 1076 is 50° C. to 52° C.), fluctuations in temperature in localized areas of the equipment or the surrounding environment after prolonged heating, combined with electrostatic adsorption, often cause a part of the antioxidant to adhere to or clog the hopper, conveying screw, or an inlet port of the mixing equipment. This results in a part of the antioxidant actually not being added to the material system, leading to deviations from the material ratio and the designed formulation, as well as non-uniform material particles and performance. Due to the above problems, some antioxidants with a high performance but a low melting point cannot be used in the actual production. For insulating materials with a low voltage level of 220 kV or below, deviations in the material ratio are usually acceptable, and the selection of the antioxidant has no strict requirement. However, for insulating materials for cables at 500 KV or above, the additive formulation of the material may be more complex, necessitating the use of low-melting-point additives, and the uniformity of the material ratio is crucial. Therefore, the above problems must be properly resolved to enhance the research and development of the cross-linked polyethylene insulating materials with a voltage level of 500 kV or above.

SUMMARY

An antioxidant addition device for a 500 KV cross-linked polyethylene insulating material is provided, including a heating hopper module and a heat-insulation conduit module. The heating hopper module includes an inlet port, a heating jacket, a material bin, and a filter screen. The material bin is positioned vertically. The inlet port is provided at an initial portion of the material bin. The heating jacket is provided surrounding an outer peripheral wall of the material bin. A terminal end of the material bin is connected to the heat-insulation conduit module. The filter screen is positioned in front of the heat-insulation conduit module. The heat-insulation conduit module includes a liquid metering pump, a stainless steel liquid-conduit, a heat-insulation unit, and an outlet port. One end of the liquid metering pump is connected to a horizontal conduit of the material bin. The other end of the liquid metering pump is connected to one end of the stainless steel liquid-conduit. The other end of the stainless steel liquid-conduit is provided with the outlet port. The stainless steel liquid-conduit is surrounded by the heat-insulation unit. The antioxidant is added into the material bin through the inlet port, heated in the material bin to a liquid phase antioxidant, filtered through the filter screen, then metered by the liquid metering pump, then passed into the stainless steel liquid-conduit, and finally discharged through the outlet port for use.

In an embodiment of the present application, a front end of the filter screen is further provided with a slide valve which is constructed as an openable and closable structure. When the antioxidant has not completely achieved the liquid phase, the slide valve (6) remains closed.

In an embodiment of the present application, a sealing ring is provided between the slide valve and the material bin.

In an embodiment of the present application, the filter screen is mounted on a removable screen plate. The removable screen plate is provided with a pull handle thereon. The removable screen plate is mounted on or removed from the material bin via a positioning sleeve.

In an embodiment of the present application, the liquid metering pump has an accuracy of 0.01% F.S.

In an embodiment of the present application, the heat-insulation unit includes a heat-insulation box, a heat-insulation coil, a control panel, and a mold temperature controller.

In an embodiment of the present application, the mold temperature controller is positioned beneath the stainless steel liquid-conduit, with both ends of the heat-insulation coil connected to the mold temperature controller, and a middle section of the heat-insulation coil is wrapped around an outer peripheral wall of the stainless steel liquid-conduit.

In an embodiment of the present application, the heat-insulation box covers an outside of both the stainless steel liquid-conduit and the heat-insulation coil and creates an enclosed space with an upper surface of the mold temperature controller.

In an embodiment of the present application, the control panel is positioned on a surface of the mold temperature controller and configured to control the mold temperature controller.

In an embodiment of the present application, the mold temperature controller is provided with a pressure gauge thereon.

In an embodiment of the present application, the material bin is provided with an observation window.

An antioxidant addition method using the antioxidant addition device for the 500 KV cross-linked polyethylene insulating material as described above is provided. The antioxidant addition method includes the following steps:

step 1, adding an antioxidant into the material bin through the inlet port, and heating the material bin by the heating jacket such that the antioxidant is in a liquid phase state;

step 2, filtering the antioxidant in liquid phase through the filter screen and then passing the antioxidant in liquid phase into the liquid metering pump for metering;

step 3, introducing the metered antioxidant in liquid phase uniformly into a twin-screw extruder through the stainless steel liquid-conduit and the outlet port to be mixed with a polyethylene resin.

In an embodiment of the present application, the antioxidant is weighed by a loss-in-weight electronic scale with a measurement accuracy of 0.01% F.S. before being heated to the liquid phase state.

In an embodiment of the present application, each of the heating jacket, the liquid metering pump, and the heat-insulation unit has an operating temperature above a melting temperature of the antioxidant.

In an embodiment of the present application, a weight ratio of the antioxidant in liquid phase to a polyethylene resin satisfies the following formula:

$$F_v = \frac{nG}{\rho}$$

wherein:
$F_v$—a volume rate of the antioxidant in liquid phase;
G—a weight rate of the polyethylene resin;
$\rho$—a density of the antioxidant in liquid phase;
n—the weight ratio of the antioxidant in liquid phase to the polyethylene resin.

Figure 1:
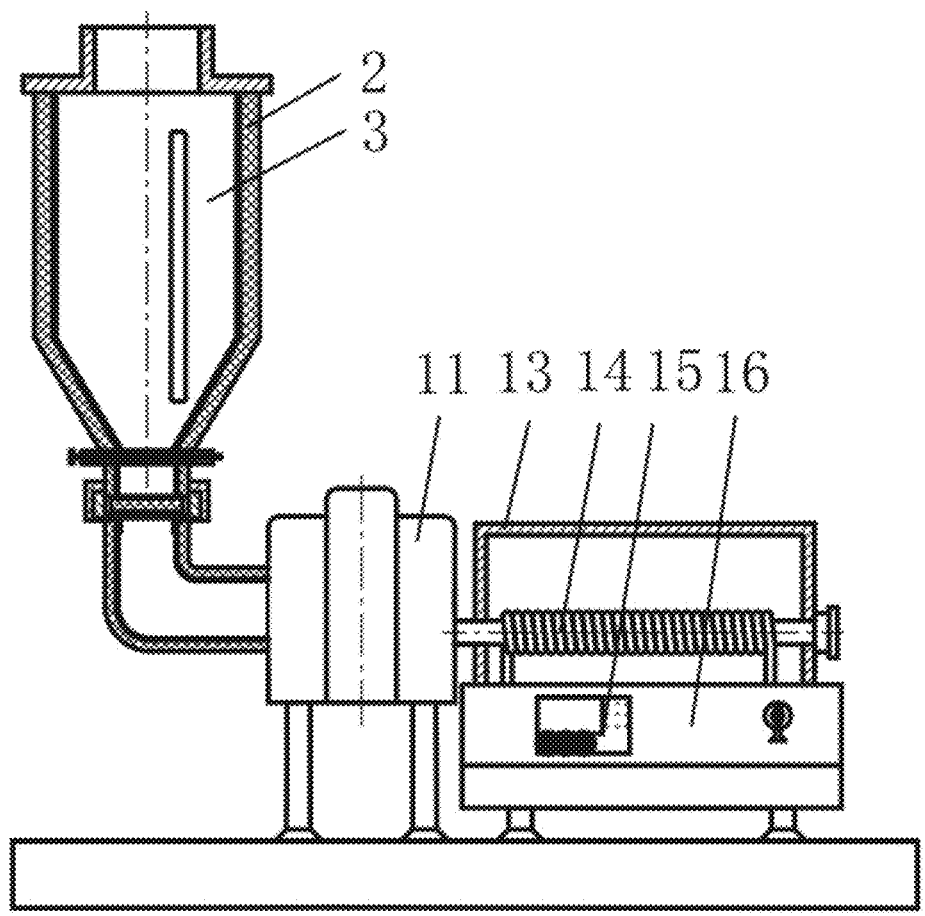
FIG. 1 is a schematic structural view of an antioxidant addition device for 500 kV cross-linked polyethylene insulating material of the present application.

In the drawings:
1—inlet port; 2—heating jacket; 3—material bin; 4—observation window; 5—sealing ring; 6—slide valve; 7—filter screen; 8—removable screen plate; 9—positioning sleeve; 10—pull handle; 11—liquid metering pump; 12—stainless steel liquid-conduit; 13—heat-insulation box; 14—heat-insulation coil; 15—control panel; 16—mold temperature controller; 17—pressure gauge; 18—outlet port.

DETAILED DESCRIPTION

In order to make the purposes, technical solutions and advantages of the present application clearer, the technical solutions of the present application will be clearly and completely described hereinafter with reference to accompanying drawings in the embodiments of the present application. The embodiments described in the present application are merely some rather than all of the embodiments of the present application. All other embodiments obtained by a person of ordinary skill in the art based on the spirit of the present application without creative efforts shall fall within the protection scope of the present application.

FIG. 1 is a schematic structural view of an antioxidant addition device for a 500 KV cross-linked polyethylene insulating material of the present application. As is shown in FIG. 1, the antioxidant addition device for the 500 KV cross-linked polyethylene insulating material of the present application includes a heating hopper module and a heat-insulation conduit module.

The heating hopper module includes an inlet port 1, a heating jacket 2, a material bin 3, and a filter screen 7. The material bin 3 is positioned vertically. The inlet port 1 is provided at an initial portion of the material bin 3. The heating jacket 2 is provided surrounding an outer peripheral wall of the material bin 3. A terminal end of the material bin 3 is connected to the heat-insulation conduit module. The filter screen 7 is positioned in front of the heat-insulation conduit module.

The volume of the material bin 3 is preferably 5 L to 10 L. The electric power of the heating jacket 2 is preferably 2 kW to 3 kW.

The temperature of the heating jacket 2 is set to be above the melting temperature of the antioxidant to facilitate the transition of the antioxidant to a liquid phase state. Preferably, the temperature of the heating jacket 2 is set to be 20° C. to 30° C. above the melting temperature of the antioxidant. This not only ensures rapid melting of the antioxidant but also minimizes energy consumption and reduces the loss of the antioxidant at high temperature.

The mesh number of the filter screen 7 is determined based on the purification level requirement on the insulating material, ensuring that the minimum aperture of the filter screen is smaller than the maximum impurity particle size allowed in the insulating material. For the cross-linked polyethylene insulating material rated at 500 kV or above, the aperture of the filter screen must be maintained at 50 μm or less, and may be further restricted to a smaller size based on the impurity content and size requirements on the insulating material.

The heat-insulation conduit module includes a liquid metering pump 11, a stainless steel liquid-conduit 12, a heat-insulation unit, and an outlet port 18. One end of the liquid metering pump 11 is connected to a horizontal conduit of the material bin 3, and the other end of the liquid metering pump 11 is connected to one end of the stainless steel liquid-conduit 12. The other end of the stainless steel liquid-conduit 12 is provided with the outlet port 18. The stainless steel liquid-conduit 12 is surrounded by the heat-insulation unit.

The liquid metering pump 11 has an accuracy of 0.01% F.S. The operating temperature of the liquid metering pump 11 is required to be higher than the melting temperature of the antioxidant to prevent the antioxidant from cooling and solidifying due to excessively low temperature during weighing of the antioxidant. Preferably, the operating temperature of the liquid metering pump 11 is 20° C. to 30° C. above the melting temperature of the antioxidant.

The antioxidant is added into the material bin 3 through the inlet port 1, heated to a liquid phase in the material bin 3, filtered through the filter screen 7, then metered by the liquid metering pump 11, then passed into the stainless steel liquid-conduit 12, and finally discharged through the outlet port 18 for use.

Figure 2:
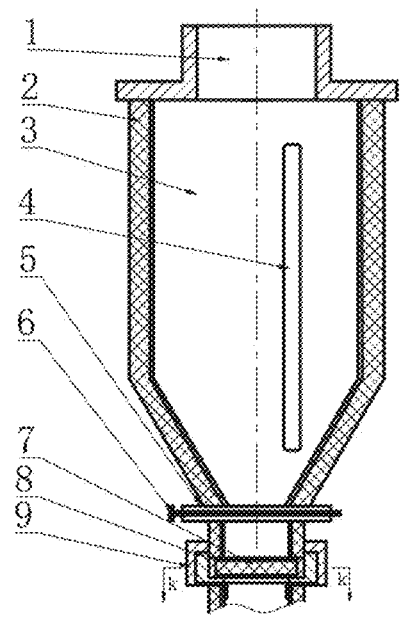
FIG. 2 is a structural view of a heating hopper module in FIG. 1.

As shown in FIG. 2, a front end of the filter screen 7 is further provided with a slide valve 6 which is constructed as an openable and closable structure. When the antioxidant has not completely achieved the liquid phase, the slide valve 6 remains closed. A sealing ring 5 is provided between the slide valve 6 and the material bin 3.

When the antioxidant in the material bin 3 has not completely achieved the liquid phase state, the slide valve 6 remains closed. Once the antioxidant has been completely achieved the liquid phase state, the slide valve 6 is opened, allowing the liquid phase antioxidant to be filtered through the filter screen 7 and then passed into the liquid metering pump 11 for weighing.

Figure 3:
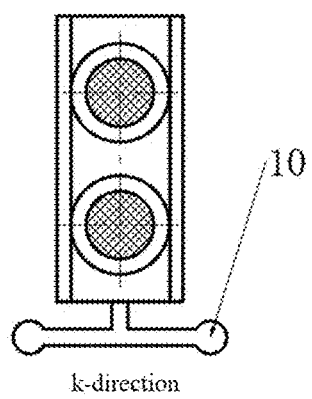
FIG. 3 is a k-direction view of a removable screen plate in FIG. 2.

As shown in FIG. 3, the filter screen 7 is mounted on a removable screen plate 8. The removable screen plate 8 is provided with a pull handle 10 thereon. The removable screen plate 8 is mounted on or removed from the material bin 3 via a positioning sleeve 9.

The removable screen plate 8 allows for the withdrawn of the filter screen 7 for maintenance or replacement when the filter screen 7 becomes clogged or damaged.

The material bin 3 is provided with an observation window 4 thereon, allowing for observing a melting condition of the antioxidant in the material bin 3 via the observation window 4.

Figure 4:
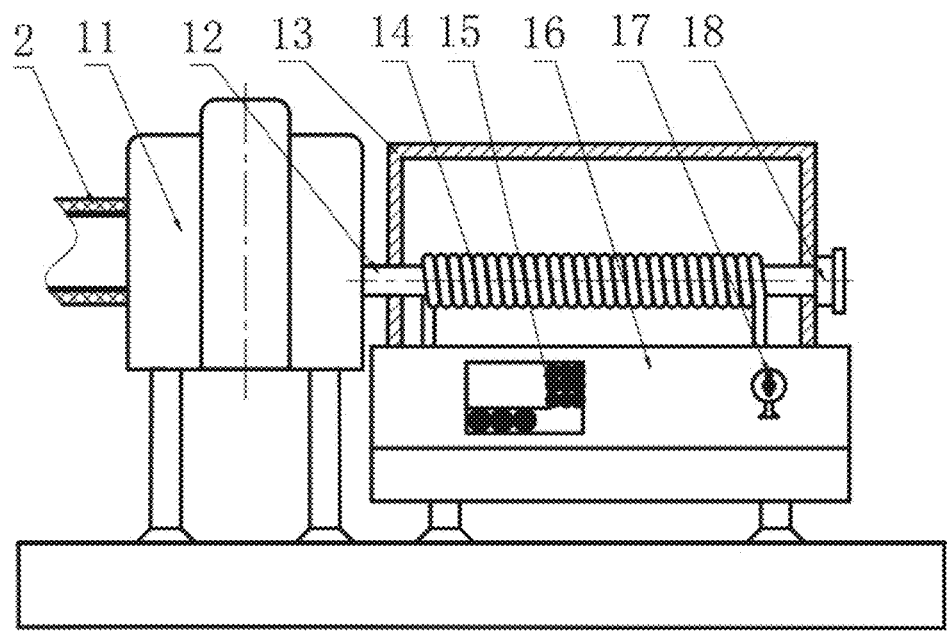
FIG. 4 is a structural view of a heat-insulation conduit module in FIG. 1.

As shown in FIG. 4, the heat-insulation unit includes a heat-insulation box 13, a heat-insulation coil 14, a control panel 15, and a mold temperature controller 16.

The mold temperature controller 16 is positioned beneath the stainless steel liquid-conduit 12. Both ends of the heat-insulation coil 14 are connected to the mold temperature controller 16, and a middle section of the heat-insulation coil 14 is wrapped on an outer peripheral wall of the stainless steel liquid-conduit 12 for maintaining the temperature in the stainless steel liquid-conduit 12.

The heat-insulation box 13 covers an outside of both the stainless steel liquid-conduit 12 and the heat-insulation coil 14 and creates an enclosed space with the upper surface of the temperature control unit 16. The heat-insulation box 13 is configured to reduce the temperature dissipation from the heat-insulation coil 14 and the stainless steel liquid-conduit 12.

The control panel 15 is positioned on a surface of the mold temperature controller 16 and configured to control the mold temperature controller 16. The mold temperature controller 16 is provided with a pressure gauge 17 thereon. The pressure gauge 17 is configured to monitor an operational state of the mold temperature controller 16.

The mold temperature controller 16 controls the temperature of the heat-insulation coil 14 to be higher than the melting temperature of the antioxidant, so that when the antioxidant flows through the stainless steel liquid-conduit 12, the antioxidant will be prevented from cooling and solidifying due to an excessively low temperature. Preferably, the temperature of the heat-insulation coil 14 is 20° C. to 30° C. above the melting temperature of the antioxidant.

The stainless steel liquid-conduit 12 preferably has a diameter of 5 mm to 10 mm.

Figure 5:
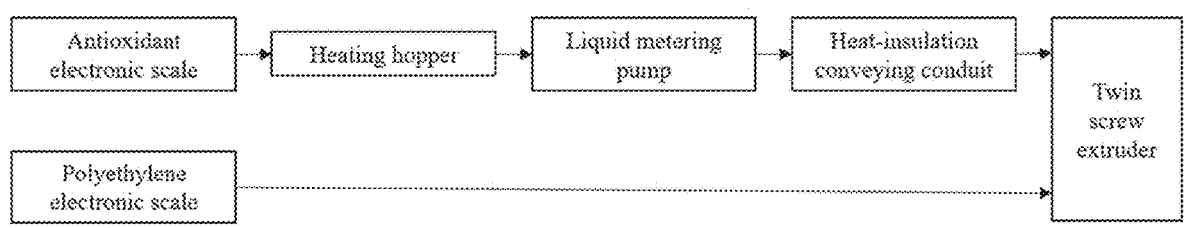
FIG. 5 is a schematic block diagram of a high-precision antioxidant addition method for the 500 kV cross-linked polyethylene of the present application.

As shown in FIG. 5, there is provided a method for adding the antioxidant using the antioxidant addition device for the 500 KV cross-linked polyethylene insulating material as described above. The method for adding the antioxidant includes the following steps:

step 1, adding the antioxidant into the material bin 3 through the inlet port 1, and heating the material bin 3 via a heating jacket 2 such that the antioxidant is in a liquid phase state;

step 2, filtering the liquid phase antioxidant through the filter screen 7 and then passing the liquid phase antioxidant to the liquid metering pump 11 for metering;

step 3, introducing the metered liquid phase antioxidant uniformly into a twin-screw extruder through the stainless steel liquid-conduit 12 and the outlet port 18 to be mixed with a polyethylene resin.

The antioxidant is weighed by a loss-in-weight electronic scale with a measurement accuracy of 0.01% F.S. before being heated to the liquid phase state.

The polyethylene resin is weighed by a loss-in-weight electronic scale with a measurement accuracy of 0.01% F.S.

The weight ratio of the liquid phase antioxidant to the polyethylene resin satisfies the following formula:

$$F_v = \frac{nG}{\rho}$$

wherein:

$F_v$—the volume rate of the liquid phase antioxidant;

$G$—the weight rate of the polyethylene resin;

$\rho$—the density of the liquid phase antioxidant; and $n$—the weight ratio of the liquid phase antioxidant to the polyethylene resin.

Compared with the prior art, the present application has the following beneficial effects:

In the antioxidant addition device and method for the 500 kV cross-linked polyethylene insulating material of the present application, the antioxidant is added in its liquid phase, so that the antioxidant can be fully mixed with the polyethylene resin, allowing the material ratio to adhere closely to the designed formulation, thus avoiding the non-uniformities of material particles and insulating performance caused by inaccurate addition of solid material. In addition, the raw material is metered using the high-precision device such as the loss-in-weight electronic scale and the high-precision liquid metering pump, so that the material ratio of the resulting cross-linked polyethylene material adheres more closely to the design formulation. Therefore, the problems such as adhesion and clogging of the antioxidant with a low melting point due to the processing technology are solved, and the flexibility of selecting additives during formulation design process of the cross-linked polyethylene insulating material is improved.

Finally, it should be noted that the above embodiments are only used to illustrate rather than to limit the technical solutions of the present application. Although the present application has been described in detail with reference to the above embodiments, the person of ordinary skill in the art should understand that the specific embodiments of the present application can still be modified or replaced by equivalent ones, and any modifications or equivalent replacements that do not depart from the spirit and scope of the present application shall be covered by the scope of protection of the claims of the present application.

What is claimed is:

1. An antioxidant addition device for a 500 kV cross-linked polyethylene insulating material, comprising a heating hopper module and a heat-insulation conduit module, wherein:
   the heating hopper module comprises an inlet port, a heating jacket, a material bin, and a filter screen, the material bin is positioned vertically; the inlet port is provided at an initial portion of the material bin, the heating jacket is provided surrounding an outer peripheral wall of the material bin, a terminal end of the material bin is connected to the heat-insulation conduit module, and the filter screen is positioned in front of the heat-insulation conduit module;
   the heat-insulation conduit module comprises a liquid metering pump, a stainless steel liquid-conduit, a heat-insulation unit, and an outlet port, one end of the liquid metering pump is connected to a horizontal conduit of the material bin, the other end of the liquid metering pump is connected to one end of the stainless steel liquid-conduit, the other end of the stainless steel liquid-conduit is provided with the outlet port, and the stainless steel liquid-conduit is surrounded by the heat-insulation unit; and
   an antioxidant is added into the material bin through the inlet port, heated in the material bin to a liquid phase antioxidant, filtered through the filter screen, then metered by the liquid metering pump, then passed into the stainless steel liquid-conduit, and finally discharged through the outlet port for use.

2. The antioxidant addition device for the 500 kV cross-linked polyethylene insulating material according to claim 1, wherein:
   a front end of the filter screen is further provided with a slide valve which is constructed as an openable and closable structure, and when the antioxidant has not been completely transitioned into the liquid phase, the slide valve remains closed; and
   a sealing ring is provided between the slide valve and the material bin.

3. The antioxidant addition device for the 500 kV cross-linked polyethylene insulating material according to claim 2, wherein:
   the filter screen is mounted on a removable screen plate, the removable screen plate is provided with a pull handle thereon, and the removable screen plate is mounted on or removed from the material bin via a positioning sleeve.

4. The antioxidant addition device for the 500 kV cross-linked polyethylene insulating material according to claim 1, wherein:
   the liquid metering pump has an accuracy of 0.01% F.S.

5. The antioxidant addition device for the 500 kV cross-linked polyethylene insulating material according to claim 1, wherein:
   the heat-insulation unit comprises a heat-insulation box, a heat-insulation coil, a control panel, and a mold temperature controller.

6. The antioxidant addition device for the 500 kV cross-linked polyethylene insulating material according to claim 5, wherein:
   the mold temperature controller is positioned beneath the stainless steel liquid-conduit, with both ends of the heat-insulation coil connected to the mold temperature controller, and a middle section of the heat-insulation coil is wrapped around an outer peripheral wall of the stainless steel liquid-conduit; and
   the heat-insulation box covers an outside of both the stainless steel liquid-conduit and the heat-insulation coil and creates an enclosed space with an upper surface of the mold temperature controller.

7. The antioxidant addition device for the 500 kV cross-linked polyethylene insulating material according to claim 5, wherein:
   the control panel is positioned on a surface of the mold temperature controller and configured to control the mold temperature controller.

8. The antioxidant addition device for the 500 kV cross-linked polyethylene insulating material according to claim 6, wherein:
   the mold temperature controller is provided with a pressure gauge thereon.

9. The antioxidant addition device for the 500 kV cross-linked polyethylene insulating material according to claim 1, wherein:
   the material bin is provided with an observation window.

10. An antioxidant addition method using the antioxidant addition device for the 500 kV cross-linked polyethylene insulating material according to claim 1, wherein the antioxidant addition method comprises:
    adding an antioxidant into the material bin through the inlet port, and heating the material bin by the heating jacket such that the antioxidant is in a liquid phase state;
    filtering the antioxidant in liquid phase through the filter screen and then passing the antioxidant in liquid phase into the liquid metering pump for metering; and
    introducing the metered antioxidant in liquid phase uniformly into a twin-screw extruder through the stainless steel liquid-conduit and the outlet port to be mixed with a polyethylene resin.

11. The antioxidant addition method according to claim 10, wherein:
    the antioxidant is weighed by a loss-in-weight electronic scale with a measurement accuracy of 0.01% F.S. before being heated to the liquid phase state.

12. The antioxidant addition method according to claim 10, wherein:
    each of the heating jacket, the liquid metering pump, and the heat-insulation unit has an operating temperature above a melting temperature of the antioxidant.

13. The antioxidant addition method according to claim 10, wherein:
    a weight ratio of the antioxidant in liquid phase to a polyethylene resin satisfies the following formula:

$$F_v = \frac{nG}{\rho}$$

wherein:
$F_v$—a volume rate of the antioxidant in liquid phase;
G—a weight rate of the polyethylene resin;
$\rho$—a density of the antioxidant in liquid phase;

n—the weight ratio of the antioxidant in liquid phase to the polyethylene resin.

* * * * *